(12) United States Patent
Zakaria (10) Patent No.: US 11,102,183 B2
(45) Date of Patent: Aug. 24, 2021

(54) SATELLITE BASED INTERNET OF THINGS NETWORK

(71) Applicant: Gaguk Zakaria, Germantown, MD (US)

(72) Inventor: Gaguk Zakaria, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/847,325

(22) Filed: Apr. 13, 2020

(65) Prior Publication Data

US 2021/0152527 A1 May 20, 2021

Related U.S. Application Data

(60) Provisional application No. 62/935,410, filed on Nov. 14, 2019.

(51) Int. Cl.
| H04L 29/06 | (2006.01) |
| H04L 29/12 | (2006.01) |
| H04L 12/66 | (2006.01) |
| H04W 80/04 | (2009.01) |

(52) U.S. Cl.
CPC .......... *H04L 63/0428* (2013.01); *H04L 12/66* (2013.01); *H04L 61/103* (2013.01); *H04L 61/2015* (2013.01); *H04L 63/164* (2013.01); *H04W 80/04* (2013.01)

(58) Field of Classification Search
None
See application file for complete search history.

(56) References Cited

U.S. PATENT DOCUMENTS

| 2014/0011441 A1* | 1/2014 | Lauer ................... H04W 84/005 455/3.06 |
| 2016/0255420 A1* | 9/2016 | McCleland ........... H04W 4/026 340/870.07 |
| 2018/0316416 A1 | 11/2018 | Reis et al. |

(Continued)

OTHER PUBLICATIONS

International search report for PCT Application No. PCT/US2020/060123.

(Continued)

*Primary Examiner* — Otis L Thompson, Jr.
(74) *Attorney, Agent, or Firm* — Capitol City TechLaw; Jasbir Singh (57) ABSTRACT

A system and method for communicating with an Internet of Things (IoT) User Terminal (UT) population. The method includes storing UT parameters for each UT of the UT population with a security and repository server (SRS), where the UT parameters include a UT identifier, a UT IP address, and an application server IP address; communicating from the UT population using a one-shot transmission via an over-the-air (OTA) link; receiving the one-shot transmission from a sender UT of a UT population; and sending an IP packet including a portion of the one-shot transmission to an application server. In the method, the one-shot transmission includes an unscheduled transmission between the GW and UT, the one-shot transmission includes a sender UT identifier, and the UT identifier for each UT of the UT population is unique.

20 Claims, 4 Drawing Sheets

(56) References Cited

U.S. PATENT DOCUMENTS

2020/0100291 A1* 3/2020 Ravishankar ..... H04W 74/0833
2020/0128377 A1* 4/2020 Dio ..................... H04W 72/02

OTHER PUBLICATIONS

Soua Ridha et al: "IoT Application Protocols Optimisation for Future Integrated M2M-Satellite Networks", 2018 Global Information Infrastructure and Networking Symposium (GIIS), IEEE, Oct. 23, 2018 (Oct. 23, 2018), pp. 1-5, XP033515994, DOI: 10.1109/GIIS.2018.8635784 [retrieved on Feb. 5, 2019].

* cited by examiner

SATELLITE BASED INTERNET OF THINGS NETWORK

CROSS-REFERENCE TO RELATED APPLICATIONS AND INCORPORATION BY REFERENCE

The present application claims the benefit under 35 U.S.C. 119(e) of U.S. Provisional Application Ser. No. 62/935,410, filed Nov. 14, 2019, which is incorporated herein by reference in its entirety.

FIELD

A system and method to provide signaling and data transfer for Internet of Things (IoT) networks via a satellite link without a lengthy signaling procedure. Data and signaling traffic over the satellite link may be secured via encryption. Encryption keys for data and signaling traffic may be secured with a security and repository server. Data traffic is delivered to an application server.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings provide signaling and data transfer for Internet of Things (IoT) networks via a satellite link without a lengthy signaling procedure. Encryption keys for data and signaling traffic may be secured with a security and repository server. Data traffic is delivered to an application server.

A system of one or more computers can be configured to perform particular operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes an Internet of Things (IoT) system including a Security and Repository Server (SRS) to store UT parameters for each UT of a UT population, where the UT parameters may include a UT identifier, a UT IP address, and an application server IP address; an Over-The-Air (OTA) link to communicate from the UT population using a one-shot transmission; and a gateway (GW) configured to receive the one-shot transmission from a sender UT of a UT population and to send an IP packet including a portion of the one-shot transmission to an application server. In the system, the one-shot transmission includes an unscheduled transmission between the GW and UT, the one-shot transmission may include a sender UT identifier, and the UT identifier for each UT of the UT population is unique. Other embodiments of this aspect include corresponding computer systems, apparatus, and computer programs recorded on one or more computer storage devices, each configured to perform the actions of the methods.

Implementations may include one or more of the following features. The system where the GW is further configured to retrieve sender UT parameters associated with the sender UT identifier, and generate the IP packet may include the UT IP address of the sender UT parameters as a sender and the application server IP address of the sender UT parameters as a destination. The one-shot transmission does not include an IP source address or an IP destination address. The UT IP address for each UT of the UT population is unique. For each UT of the UT population, the SRS authenticates the UT, distributes the UT parameters and refreshes the UT parameters. The UT parameters may include encryption/integrity keys, and the encryption/integrity keys may include an application key for communications between the UT population and the application server, an OTA key for communications between the UT population and the GW, and a signaling key for communications between the SRS and the UT population. The UT parameters may include application keys including a respective application key for each UT of the UT population, and communications between a respective UT of the UT population and the application server uses the respective application key. The UT parameters may include OTA keys including a respective OTA key for each UT of the UT population, and communications between a respective UT of the UT population and the GW uses the respective OTA key. The OTA link may include a satellite link. The system may include a first secure tunnel to communicate between the gateway and the application server, and a second secure tunnel to communicate between the gateway and the SRS. The GW may be configured to receive an application-server IP packet addressed to a receiver UT IP address from the application server, retrieve receiver UT parameters associated with the receiver UT IP address, generate a packet including a UT identifier of the receiver UT parameters and a payload of the application-server IP packet, and transmit the packet via the OTA link. Prior to the transmit, the GW may perform one or more of page the UT identifier of the receiver UT parameters, receive within an awake window the one-shot transmission from the UT identifier of the receiver UT parameters, or allocate bandwidth for the UT identifier of the receiver UT parameters. Implementations of the described techniques may include hardware, a method or process, or computer software on a computer-accessible medium.

One general aspect includes a non-transient computer-readable storage medium having instructions embodied thereon for a computer implemented method. The method includes storing UT parameters for each UT of the UT population with a security and repository server (SRS), where the UT parameters include a UT identifier, a UT IP address, and an application server IP address; communicating from the UT population using a one-shot transmission via an over-the-air (OTA) link; receiving the one-shot transmission from a sender UT of a UT population; and sending an IP packet including a portion of the one-shot transmission to an application server. In the method, the one-shot transmission may include an unscheduled transmission between the GW and UT, the one-shot transmission includes a sender UT identifier, and the UT identifier for each UT of the UT population is unique. Other embodiments of this aspect include corresponding computer systems, apparatus, and computer programs recorded on one or more computer storage devices, each configured to perform the actions of the methods.

Implementations may include one or more of the following features. The method may include: retrieving sender UT parameters associated with the sender UT identifier; and generating the IP packet may include the UT IP address of the sender UT parameters as a sender and the application server IP address of the sender UT parameters as a destination. The method may include: receiving an application-server IP packet addressed to a receiver UT IP address from the application server; retrieving receiver UT parameters associated with the receiver UT IP address; generating a packet may include a UT identifier of the receiver UT parameters and a payload of the application-server IP packet; and transmitting the packet via the OTA link. Prior to the transmitting, the method performs one or more of paging the UT identifier of the receiver UT parameter, receiving within an awake window the one-shot transmission from the UT identifier of the receiver UT parameters, or allocating bandwidth for the UT identifier of the receiver UT parameters. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

Figure 1:
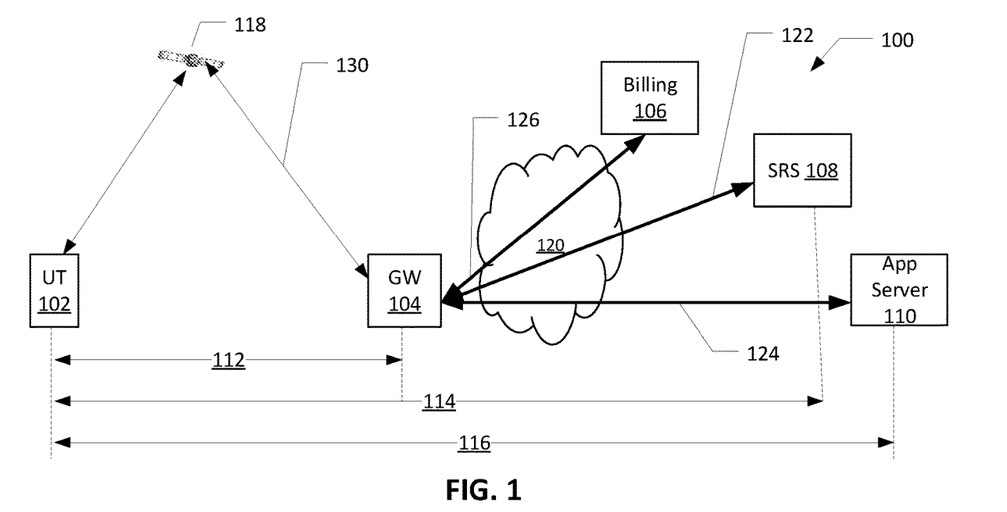
FIG. 1 illustrates a satellite IoT system according to various embodiments.

FIG. 1 illustrates a satellite IoT system according to various embodiments.

A satellite 118 based Internet of Things (IoT) network 100 that transmits unscheduled or without a lengthy signaling procedure for a User Terminal (UT) 102 to efficiently send or receive data is disclosed. In some embodiments, all signaling and data transfer are secure. The network 100 may include a Security and Repository Server (SRS) 108, a satellite gateway 104, an application server 110 and a billing server 106.

An OTA message 112 between the UT 102 and the satellite gateway 104 traverse a satellite link 130 via the satellite 118. The OTA message 112 over the satellite link 130 is not based on the Internet Protocol (IP). The OTA message 112 may be secure. The satellite gateway 104 may serve a plurality of user terminals. The OTA message 112 may use one data key for messaging to the plurality of user terminals. In some embodiments, the OTA message 112 may use a unique data key for one or some of the plurality of user terminals, for example, one to one, one to many, one to all correspondence between a data key and UT.

A signaling message 114 between the UT 102 and the SRS 108 traverses the satellite link 130 and a tunnel 122. The tunnel 122 may be a secure tunnel. A user data message 116 between the UT 102 and the application server 110 traverses the satellite link 130 and a tunnel 124. The tunnel 124 may be a secure tunnel. Communication between the satellite gateway 104 and the billing server 106 may traverse a tunnel 126. The tunnel 126 may be a secure tunnel. Tunnels 122, 124, 126 may be secured using IPsec or similar methods. Each of the tunnels 122, 124, 126 may be separate tunnels that may traverse the internet 120.

Security and Repository Server (SRS) Functions

The SRS may store UT parameters, manage UT keys, authenticate the UT, generate encryption and/or integrity protection keys, and distribute the keys. Exemplary keys generated and distributed by the SRS include an application key to protect user data, an OTA key to protect an OTA message and signaling key to protect a signaling message between the SRS and the UT.

The SRS manages a UT ID that is unique for each UT. The UT ID is mapped by the SRS to the UT keys, a UT IP address and an associated Application Server IP address. The SRS forwards to the satellite gateway with the UT IP address and the associated Application server IP address. In some embodiments the SRS maps the UT ID to UT parameters, for example, a QoS, UT radio capability, UT transmission opportunity (wakeup time), UT operator, and the like. The SRS may forward the UT parameters to the satellite gateway.

Gateway (GW) Functions

For data received from a UT (Uplink or UL), a gateway may form a packet by joining UT data from a UT with a corresponding UT IP address as a source IP address and an application server IP Address as the destination IP address, and sends the packet to the Application Server. For data to be sent to a UT (downlink or DLL), the gateway deconstructs a packet from an application serve, maps the incoming source and destination IP addresses in the packet to a UT ID, and sends the data to the UT as non-IP data.

The gateway may send a Call Detail Record (CDR) for each UT to the Billing server. Each CDR may be identified by the UT ID. The billing server may receive CDR CDR for each UT and create billing based on the UT ID. The gateway decodes UT UL data using the OTA key and sends the UT data, which is encrypted by the application key, to the Application server. The gateway may encode the DL data from the Application Server with the OTA keys and sends the encoded data to the UT. The gateway may provide quality of service (QoS) treatment based on the UT parameters given by the SRS to the gateway. The gateway may page the UT. For a LEO/MEO satellite network, the gateway may estimate the covering beam based on the UT location.

Application Server

The application server processes UT data. The applicant server may receives/sends data to the UT. The applicant server may send a command to the UT. The applicant server may manage different type of UTs.

User Terminal (UT)

Each UT may be deployed with an embedded Initial Key and UT ID. In some embodiments, UT data is non-IP data. UT uplink transmission mode is based on the one shot UT transmission. Each UT transmission (UL or DL) is encrypted and integrity protected using OTA keys. Each UT application data is encrypted and integrity protected using application teams. Each UT is tied to an Application server. UT might send data periodically or ascending may be trigger-based. UT communications with SRS may be encrypted using a signal key. For a vehicular UT, the UT may report its secure location based on pre-defined method, such as distance triggered report. For LEO and MEO satellite networks, the gateway may map a UT location to the beams. In such systems, the gateway may estimate the covering beams based on the known trajectory of the satellites.

Initial Setup

Figure 2:
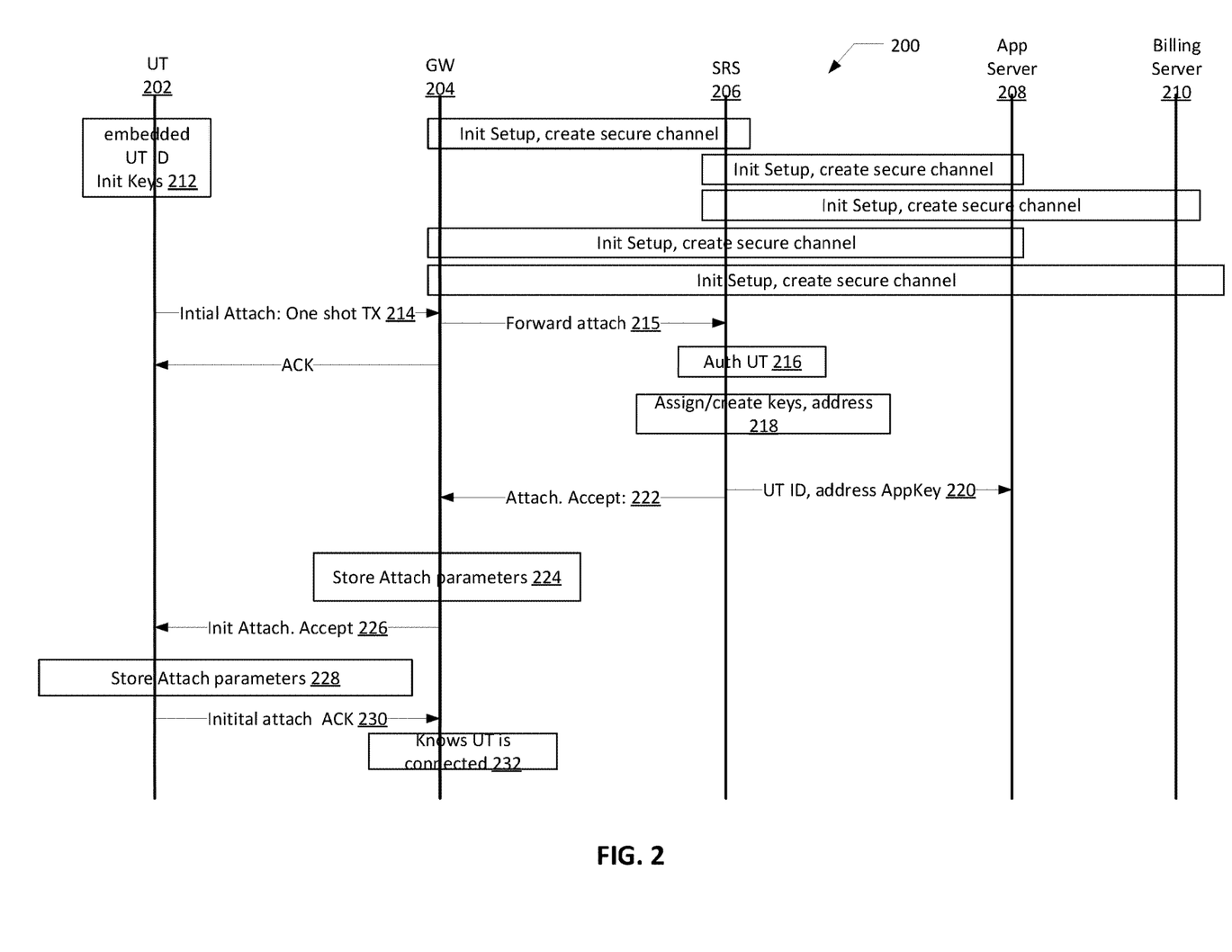
FIG. 2 illustrates initial setup of a UT in a satellite IoT system according to some embodiments.

FIG. 2 illustrates initial setup of a UT in a satellite IoT system according to some embodiments.

A satellite IoT system 200 may include a UT 202, a gateway 204, an SRS 206, an application server 208 and a billing server 210. Each UT 202 may be configured or provisioned with an embedded UT ID and initial encryption key per operation 212. The UT ID may be used to authenticate the UT 202. In some embodiments the UT ID and/or initial encryption key may only be known by the UT 202 and the SRS 206. The UT 202 may transmit an initial attach request 214 using for example a one-shot transmission to the gateway 204. The initial attach request 214 may include the UT ID and data encrypted by the initial encryption keys. In some embodiments the UT ID may be in the clear. In some embodiments the initial attach request 214 may be acknowledged by the gateway 204. In other embodiments the initial attach request 214 may not be acknowledged by the gateway 204. The gateway 204 forwards the initial attach request 214 to the SRS 206 without decryption in request 215. The gateway 204 may store the UT ID and may estimate a location of the UT. The SRS 206 authenticates the UT 202 per operation 216 by determining the initial encryption key based on the UT ID. At operation 218 the SRS 206 assigns/creates encryption keys for the UT ID, including the OTA Keys, AppKeys, SigKey. Additionally, during operation 218 the SRS 206 assigns the UT an IP address. The SRS 206 may send the UT ID, the application key and the UT IP address to the application server 208 in request 220. The SRS 206 may send response 222 to the gateway 204. Response 222 may include the OTA key, UT parameters, UT IP address, Application server IP address, an explicit UT location, or the like. The gateway 204 may store parameters provided by the response 222 per operation 224. The gateway 204 may forward parameters private provided by the response 222 to UT 202, for example, OTA Key, application key, signaling key to UT 202 in response 226. The response 226 may be encrypted using the initial key. The UT 202 stores parameters received in response 226 per operation 228. In some embodiments, the UT 202 may send an initial attachment acknowledgment response 230 to the gateway 204 that may be encrypted by the OTA key. Upon receiving the initial attachment acknowledgment response 230 the gateway 204 knows (232) that the UT 202 is connected.

Data Transfer from UT

Figure 3:
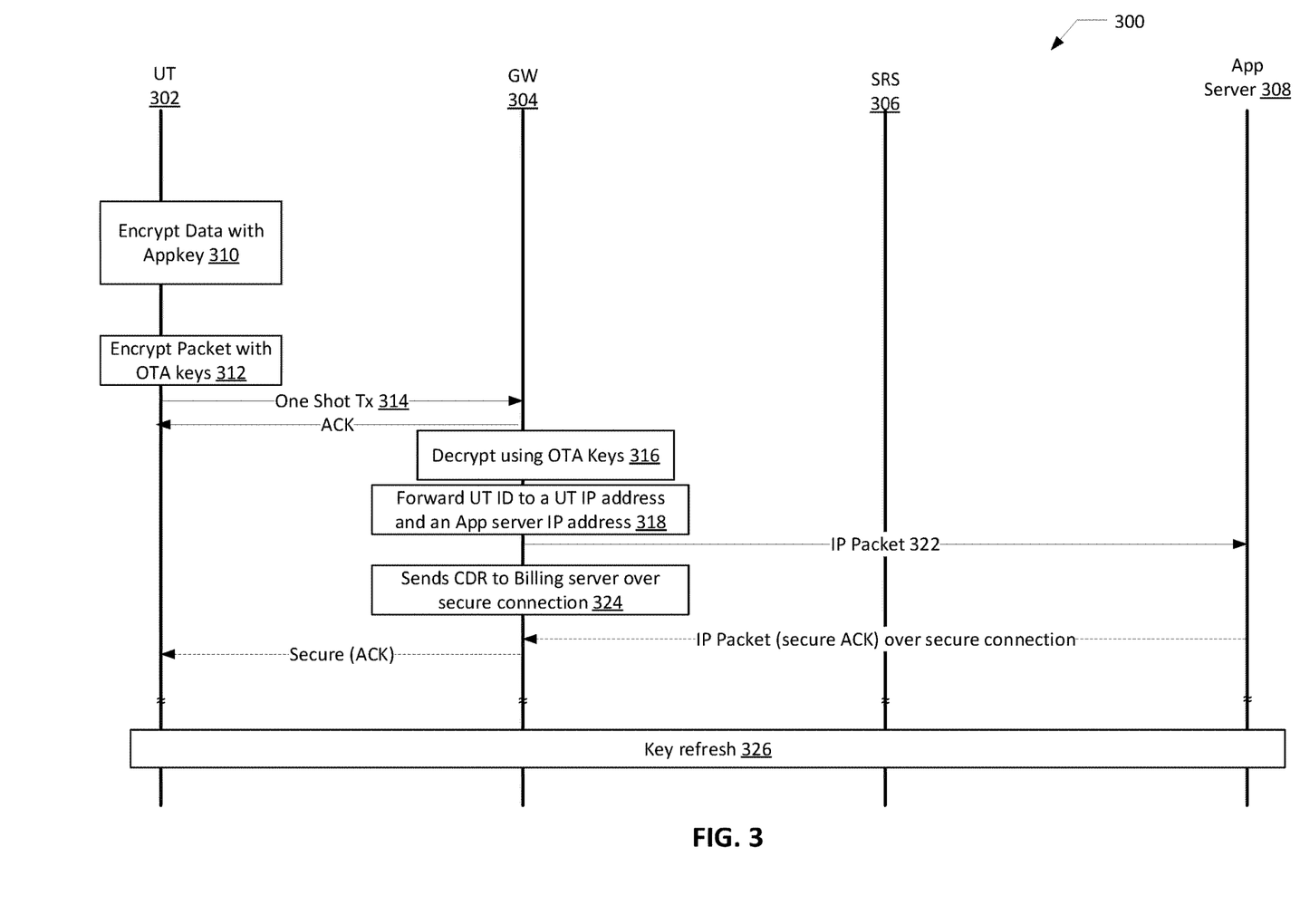
FIG. 3 illustrates data transfer from a UT to an application server in a satellite IoT system according to some embodiments.

FIG. 3 illustrates data transfer from a UT to an application server in a satellite IoT system according to some embodiments.

A satellite IoT system 300 may include a UT 302, a gateway 304, an SRS 306 and an application server 308. When the UT 302 has data to send, the data is encrypted using the Appkey per operation 310. At operation 312, a packet is formed by encrypting, using the OTA keys, at least the data supplemented with the UT ID. The packet is transmitted as a one-shot transmission 314. Transmissions from various UTs in the system 300 may use the same channel and the one-shot transmission 314 is performed without scheduling or bandwidth allocation, either by the gateway or the UT.

In some embodiments, a one-shot transmission by a UT may include sending a RACH (radio access channel) request to synchronize the UT to the gateway, where the RACH request includes data (for example, IoT data) as a payload of the RACH message. The RACH request may not request any resources from the gateway, but may merely be a means to send data sent in a one-shot transmission. The payload of the RACH request may support such a one-shot transmission as the data from the UT to the gateway does not include an IP header. A feature of a RACH is that messages are unscheduled transmissions. There is no certainty that only a single device makes a connection attempt at one time, so collisions can result. In one-shot transmissions, transmissions from different UTs may overlap, may partially overlap or not overlap. The gateway 304 includes a receiver that separates the various transmissions when feasible. For some transmissions, the gateway receiver may fail to separate the various transmissions and the transmissions may be lost. In exemplary embodiment, one-shot transmissions from the UT 302 may be unscheduled transmissions by use of implicit dynamic bandwidth allocation. Exemplary methods of implicit dynamic bandwidth allocation include Scrambled Code Multiple Access (SCMA) or Asynchronous Scrambled Code Multiple Access (A-SCMA) coding.

At operation 316 the gateway 304 decrypts the packet using the packet OTA keys to extract the UT ID. At operation 318 gateway 304 may then map the UT ID to an IP address assigned to the UT 302 by the SRS 306 and the IP address of the application server 308 associated with the UT ID by the SRS 306. During operation 318 the gateway 304 further creates an IP packet using the IP address of the application server 308, the IP address of the UT 302 and the encrypted UT data as the IP packet payload and forwards the created IP packet 322 to the application server 308. At operation 324 the gateway 304 sends a CDR to the billing server (not shown). The Application server 308 may optionally send an Application ACK. In some embodiments, an operation 326 may be used to the key refresh for the UT 302 by the SRS 306.

Data Transfer from Application Server to UT

Figure 4:
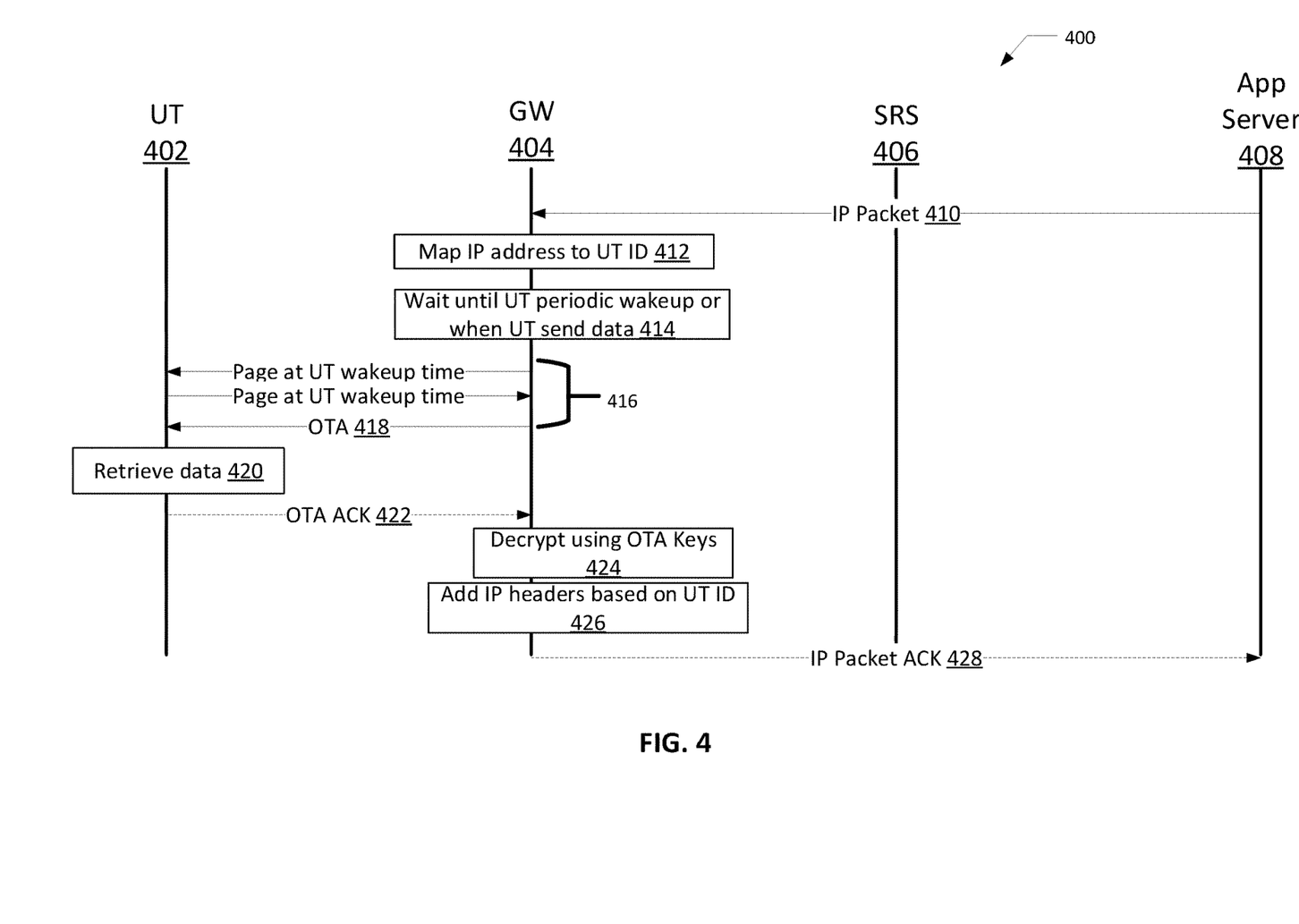
FIG. 4 illustrates data transfer from an application server to a UT in a satellite IoT system according to some embodiments.

FIG. 4 illustrates data transfer from an application server to a UT in a satellite IoT system according to some embodiments.

A satellite IoT system 400 may include a UT 402, a gateway 404, an SRS 406 and an application server 408. When the application server 408 has data to send, the data may be sent as an IP packet 410 to an IP address assigned to UT 402. The IP packet 410 may be sent securely using, for example, a tunnel. In the system 400, IP routing for the UT's IP address is established such that the UT's IP address must be routed via the gateway 404. The GW 404 maps the UT's IP address to a UT ID at operation 412. The GW 404 may wait until a UT periodic wakeup or when UT send data at operation 414. The GW 404 may then use the IP packet's payload as data to be sent to the UT. The IP's packet's payload maybe encrypted using an Application key assigned to the application server 408. The encryption may be performed either by the application server 408 or the gateway 404.

The GW 404 may then transmit the data to the UT ID via an OTA transmission 418. In some embodiments, the GW 404 may buffer the data prior to the OTA transmission 418 to the UT 402. For example, the GW 404 may buffer in order to wait until a periodic wakeup window for the UT 402 occurs. During the periodic wakeup window, the GW 404 may page and optionally wait for a page ACK from the UT 402 at operation 416, prior to the OTA transmission 418. In an exemplary embodiment, the GW 404 may buffer in order to send the OTA transmission 418 immediately after receiving a transmission from the UT 402. The OTA transmission 418 may result in the UT 402 retrieving the data at operation 420. The UT 402 may optionally acknowledge reception of the data at operation 422. The optional acknowledgement may be decrypted using OTA keys at operation 424. The GW 404 may add IP headers based on the UT ID to the optional acknowledgement at operation 426. The optional acknowledgement may be sent to the application server 408 as an IP packet ACK 428 that uses the IP address of the UT 402 as the sender of the IP packet ACK 428.

Figure 5:
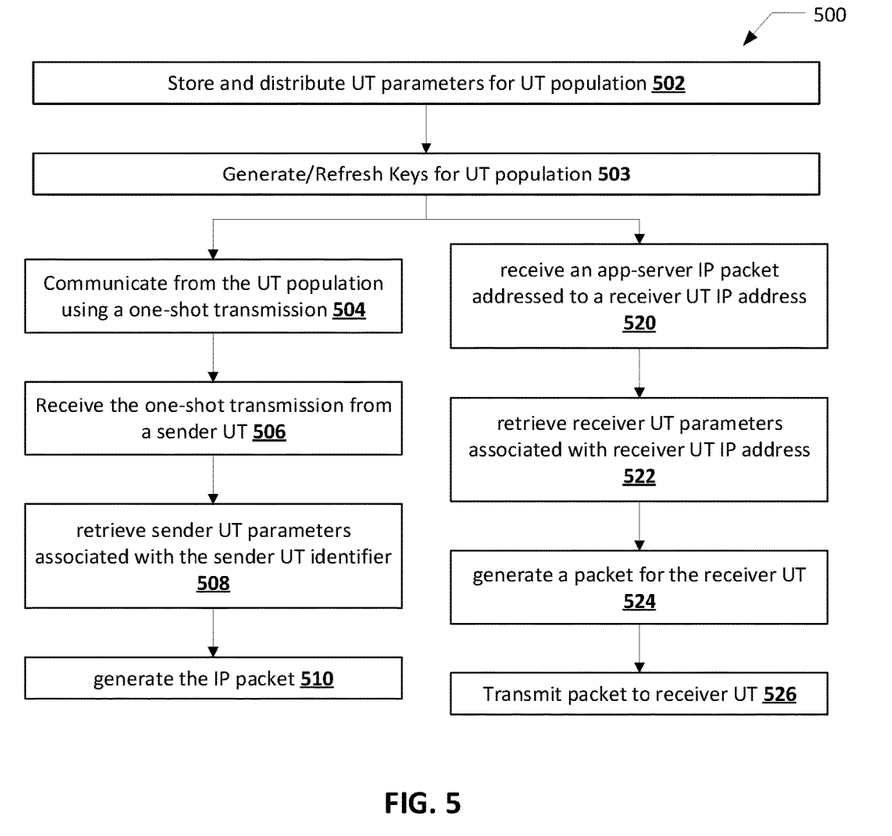
FIG. 5 illustrates a method for communicating with an Internet of Things (IoT) User Terminal (UT) population using a one-shot transmission according to various embodiments.

FIG. 5 illustrates a method for communicating with an Internet of Things (IoT) User Terminal (UT) population using a one-shot transmission according to various embodiments.

A method 500 for communicating with an Internet of Things (IoT) User Terminal (UT) population using a one-shot transmission may include operation 502 to store and distribute UT parameters for UT population. The method 500 may include operation 503 to generate/refresh Keys for UT the population. The method 500 may include operation 504 to communicate from the UT population using a one-shot transmission. The method 500 may include operation 506 to receive the one-shot transmission from a sender UT. The method 500 may include operation 508 to retrieve the sender UT parameters associated with the sender UT identifier. The method 500 may include operation 510 to generate the IP packet.

The method 500 may include operation 520 to receive an application-server IP packet addressed to a receiver UT IP address. The method 500 may include operation 522 to retrieve receiver UT parameters associated with receiver UT IP address. The method 500 may include operation 524 to generate a packet for the receiver UT. The method 500 may include operation 526 to transmit the packet to the receiver UT.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. An Internet of Things (IoT) system comprising:
   a Security and Repository Server (SRS) to store User Terminal (UT) parameters for each UT of a UT population, wherein the UT parameters comprise a UT identifier, a UT IP address, and an application server IP address;
   an Over-The-Air (OTA) link to communicate from the UT population using a one-shot transmission; and
   a gateway (GW) configured to receive the one-shot transmission from a sender UT of the UT population and to send an IP packet comprises a portion of the one-shot transmission to an application server,
   wherein the one-shot transmission comprises an unscheduled transmission between the GW and the sender UT,
   the one-shot transmission comprises a sender UT identifier, and
   a UT identifier for each UT of the UT population is unique.

2. The system of claim 1, wherein the GW is further configured to
   retrieve sender UT parameters associated with the sender UT identifier, and
   generate the IP packet comprising the UT IP address of the sender UT parameters as a sender and the application server IP address of the sender UT parameters as a destination.

3. The system of claim 1, wherein the one-shot transmission does not comprise an IP source address or an IP destination address.

4. The system of claim 1, wherein the UT IP address for each UT of the UT population is unique.

5. The system of claim 1, wherein for each UT of the UT population, the SRS authenticates the UT, distributes the UT parameters and refreshes the UT parameters.

6. The system of claim 1, wherein the UT parameters comprise encryption/integrity keys, and the encryption/integrity keys comprise an application key for communications between the UT population and the application server, an OTA key for communications between the UT population and the GW, and a signaling key for communications between the SRS and the UT population.

7. The system of claim 1, wherein the UT parameters comprise application keys comprising a respective application key for each UT of the UT population, and communications between a respective UT of the UT population and the application server uses the respective application key.

8. The system of claim 1, wherein the UT parameters comprise OTA keys comprising a respective OTA key for each UT of the UT population, and communications between a respective UT of the UT population and the GW uses the respective OTA key.

9. The system of claim 1, wherein the OTA link comprises a satellite link.

10. The system of claim 1, further comprising a first secure tunnel to communicate between the gateway and the application server, and a second secure tunnel to communicate between the gateway and the SRS.

11. The system of claim 1, wherein the GW is configured to
    receive an application-server IP packet addressed to a receiver UT IP address from the application server,
    retrieve receiver UT parameters associated with the receiver UT IP address,
    generate a packet comprising a UT identifier of the receiver UT parameters and a payload of the application-server IP packet, and
    transmit the packet via the OTA link.

12. The system of claim 11, wherein prior to the transmit, the GW is configured to perform one or more of page the UT identifier of the receiver UT parameters, receive within an awake window the one-shot transmission from the UT identifier of the receiver UT parameters, or allocate bandwidth for the UT identifier of the receiver UT parameters.

13. A non-transient computer-readable storage medium having instructions embodied thereon, the instructions being executable by one or more processors to perform a method for communicating with an Internet of Things (IoT) User Terminal (UT) population, the method comprising:
- storing UT parameters for each UT of the UT population with a Security and Repository Server (SRS), wherein the UT parameters comprise a UT identifier, a UT IP address, and an application server IP address;
- communicating from the UT population using a one-shot transmission via an Over-The-Air (OTA) link;
- receiving the one-shot transmission from a sender UT of the UT population; and
- sending an IP packet comprising a portion of the one-shot transmission to an application server,
- wherein the one-shot transmission comprises an unscheduled transmission between a gateway (GW) and the sender UT,
- the one-shot transmission comprises a sender UT identifier, and
- a UT identifier for each UT of the UT population is unique.

14. The method of claim 13, further comprising:
- retrieving sender UT parameters associated with the sender UT identifier; and
- generating the IP packet comprising the UT IP address of the sender UT parameters as a sender and the application server IP address of the sender UT parameters as a destination.

15. The method of claim 13, wherein the one-shot transmission does not comprise an IP source address or an IP destination address.

16. The method of claim 13, wherein the UT parameters comprise encryption/integrity keys, and the encryption/integrity keys comprise an application key for communications between the UT population and the application server, an OTA key for communications between the UT population and a gateway, and a signaling key for communications between the SRS and the UT population.

17. The method of claim 13, wherein the UT parameters comprise application keys comprising a respective application key for each UT of the UT population, and communications between a respective UT of the UT population and the application server uses the respective application key.

18. The method of claim 13, wherein the OTA link comprises a satellite link.

19. The method of claim 13, further comprising:
- receiving an application-server IP packet addressed to a receiver UT IP address from the application server;
- retrieving receiver UT parameters associated with the receiver UT IP address;
- generating a packet comprising a UT identifier of the receiver UT parameters and a payload of the application-server IP packet; and
- transmitting the packet via the OTA link.

20. The method of claim 19, wherein prior to the transmitting, the method performs one or more of paging the UT identifier of the receiver UT parameter, receiving within an awake window the one-shot transmission from the UT identifier of the receiver UT parameters, or allocating bandwidth for the UT identifier of the receiver UT parameters.

* * * * *